United States Patent
Osman et al.

(10) Patent No.: US 7,352,318 B2
(45) Date of Patent: Apr. 1, 2008

(54) METHOD AND SYSTEM FOR REAL TIME PULSE PROCESSING IN ATCRBS/MODE-S TRANSPONDERS

(75) Inventors: Showkat Osman, Overland Park, KS (US); Delbert E. Brandley, Gardner, KS (US)

(73) Assignee: Honeywell International Inc., Morristown, NJ (US)

( * ) Notice: Subject to any disclaimer, the term of this patent is extended or adjusted under 35 U.S.C. 154(b) by 184 days.

(21) Appl. No.: 11/263,794

(22) Filed: Oct. 31, 2005

(65) Prior Publication Data

US 2008/0030393 A1 Feb. 7, 2008

(51) Int. Cl.
*G01S 13/00* (2006.01)
*H04Q 5/22* (2006.01)
(52) U.S. Cl. .............. 342/37; 342/30; 342/32; 340/10.1; 340/10.3; 340/10.6
(58) Field of Classification Search ........... 340/10.1, 340/10.3, 10.6; 342/30, 32
See application file for complete search history.

(56) References Cited

U.S. PATENT DOCUMENTS

| | | | | |
|---|---|---|---|---|
| 5,387,915 A | * | 2/1995 | Moussa et al. | 342/40 |
| 5,471,509 A | | 11/1995 | Wood et al. | |
| 5,712,628 A | * | 1/1998 | Phillips et al. | 340/10.51 |
| 6,768,445 B1 | | 7/2004 | Johnson | |
| 6,788,245 B1 | | 9/2004 | Johnson | |
| 6,856,274 B1 | * | 2/2005 | Johnson | 342/32 |

* cited by examiner

*Primary Examiner*—Thomas H. Tarcza
*Assistant Examiner*—Harry Liu
(74) *Attorney, Agent, or Firm*—Black Lowe & Graham PLLC (57) ABSTRACT

An apparatus for processing pulses in ATCRBS/Mode S interrogations includes an antenna for receiving a radio frequency interrogation signal. The radio frequency interrogation signal is downconverted by a downconverter to an intermediate frequency signal. The intermediate frequency signal is converted to a digitized interrogation signal by an analog-to-digital converter. A processing unit, coupled to the analog-to-digital converter, detects a pulse peak in the digitized interrogation signal using a moving threshold to locate the peak pulse between a first fixed threshold and a second fixed threshold.

18 Claims, 7 Drawing Sheets

METHOD AND SYSTEM FOR REAL TIME PULSE PROCESSING IN ATCRBS/MODE-S TRANSPONDERS

FIELD OF THE INVENTION

This invention relates to the field of aircraft communication and, more specifically, to a method and system for real time pulse processing in ATCRBS/Mode-S transponders.

BACKGROUND OF THE INVENTION

Figure 1:
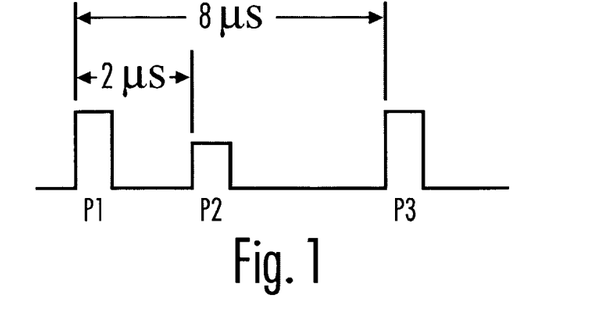
FIG. 1 illustrates the pulse format of an ATCRBS Mode A interrogation.
Figure 2:
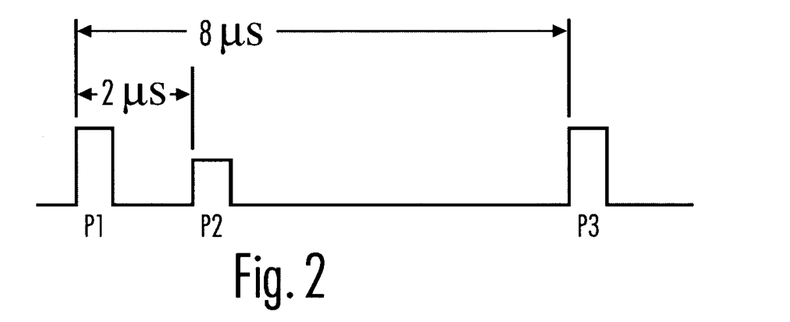
FIG. 2 illustrates the pulse format for an ATCRBS Mode C interrogation.

The air traffic control radar beacon system ("ATCRBS") was developed in 1956 as a secondary surveillance radar system for use within an air traffic control system for more accurate location of aircrafts. In the ATCRBS, a ground station transmits signals, known as "interrogations" to all aircraft within the ground station's range. There are two types of ATCRBS interrogations: Mode A interrogations and Mode C interrogations. Mode A interrogations represent a request for the identifier of the interrogated aircraft. Mode C interrogations represent a request for the altitude of the aircraft. FIG. 1 illustrates a Mode A interrogation. Mode A interrogations comprise a first pulse, $P_1$, and a second pulse, $P_2$, separated by 2 µs, and a third pulse $P_3$, separated by 8 µs from the $P_1$ pulse. FIG. 2 illustrates a Mode C interrogation. Mode C interrogations comprise a first pulse, $P_1$, a second pulse $P_2$, separated by 2 µs from the first pulse $P_1$, and a third pulse, $P_3$, separated by 21 µs from the $P_1$ pulse. Both $P_1$ and $P_3$ pulses are transmitted by the main lobe of a directional antenna. In addition, in both Mode A and Mode C interrogations, a second pulse, $P_2$, is sent 2 µs after the first pulse, $P_1$, using an omni-directional antenna in order to prevent the transponder from responding to interrogation signals that do not originate from the main lobe of the directional antenna. If $P_2$ is equal to or greater than $P_1$, the aircraft is not in the main lobe of the directional antenna and the transponder suppresses its response to the interrogation.

Upon receipt of the interrogation signal, the aircraft develops a reply signal to supply the requested information consisting of identification and/or altitude location depending on the interrogation mode. The ground station processes this information, together with time of arrival range information, to develop a measurement of position for each responding aircraft. In an ATCRBS environment, each aircraft includes a transponder that receives interrogations from and sends replies to a ground station.

There are several drawbacks to the ATCRBS system. For example, the interrogated aircraft can only provide an identifier and an altitude. The Mode C and Mode A systems also encounter a large amount of interference and garble because the Mode C and Mode A interrogation from an ATCRBS beacon interrogation is special, i.e., all aircraft transponders within the main beam of the interrogating ground station reply. This means that 25-45 interrogations and replies are transmitted into the radio frequency environment. This results in proliferation of radio frequency transmissions which can result in a significant amount of interference or garble and a corresponding loss of integrity.

Figure 3:
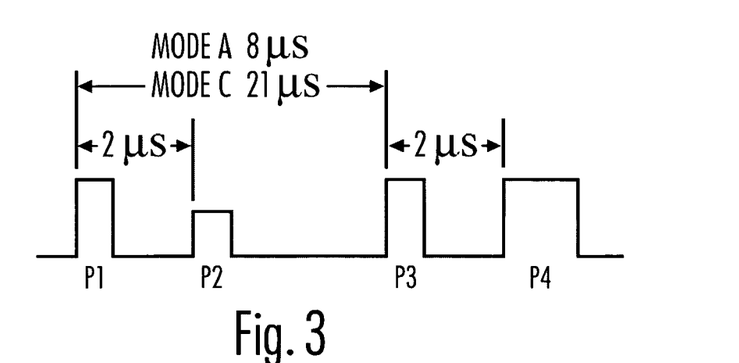
FIG. 3 illustrates the pulse formation of a ATCRBS/Mode-S "All Call" interrogation.

In recognizing these and other deficiencies in the ATCRBS, the Mode Select (Mode S) system was developed to allow the active transmission of information by a ground station or another aircraft which substantially reduced transmission interference and garble. The Mode S beacon system allows for the addressing of specific aircrafts and thereby decreases interference. In a Mode S system, an interrogation is sent to all aircrafts in the ground station's range. This interrogation is known as an "All Call" interrogation FIG. 3 illustrates a ATCRBS/Mode S "All Call" interrogation. Pulses $P_1$, $P_2$, $P_3$ and $P_4$ are transmitted by the main lobe of the ground station's antenna. A similar pattern can be used to send an ATCRBS "All Call" interrogation. The difference between the ATCRBS "All Call" interrogation and the ATCRBS/Mode S "All Call" interrogation is the width of the $P_4$ pulse. For an ATCRBS "All Call" interrogation, the $P_4$ pulse is 0.8 µs in width, while a ATCRBS/Mode S "All Call" interrogation is a 1.6 µs $P_4$ pulse.

Figure 4:
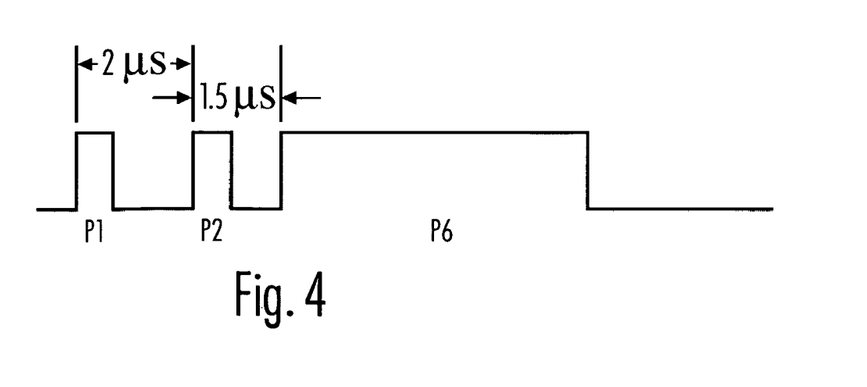
FIG. 4 illustrates the pulse formation of a selective data transmission to a Mode S transponder.

A second type of Mode S interrogation is illustrated in FIG. 4. The interrogation comprises pulse $P_1$ and pulse $P_2$ followed by a pulse $P_6$ which can be a data-containing pulse of either 16.25 µs or 30.25 µs. The pulse $P_2$ is sent with an amplitude equal to or greater than $P_1$ in order to suppress ATCRBS responses. As can be appreciated, determining whether a pulse has been received as well as determining the magnitude and/or relative magnitude of the pulse to distinguish between ATCRBS and Mode S transmissions is important.

In view of the foregoing, it is desirable to provide a method for real time pulse processing in ATCRBS/Mode S transponders that addresses one or more of the foregoing deficiencies or other deficiencies not implicitly or expressly described. Furthermore, other desirable factors and characteristics of the present invention will become apparent from the subsequent detailed description and the appended claims, taken in conjunction with the accompanying drawings and the foregoing technical field and background.

SUMMARY OF THE INVENTION

In one embodiment, a method for processing pulses from interrogations in an ATCRBS/Mode S transponder is disclosed. The method includes receiving a digital signal from an analog-to-digital converter, determining a peak pulse from the digital signal, and determining the type of peak pulse detected.

In another embodiment, an apparatus for processing pulses in ATCRBS/Mode S interrogations includes an antenna for receiving a radio frequency interrogation signal. The radio frequency interrogation signal is downconverted by a downconverter to an intermediate frequency signal. The intermediate frequency signal is converted to a digitized interrogation signal by an analog-to-digital converter. A processing unit, coupled to the analog-to-digital converter, detects a pulse peak in the digitized interrogation signal using a moving threshold to locate the peak pulse between a first fixed threshold and a second fixed threshold.

In another embodiment, a method for processing pulses from ATCRBS/Mode S interrogations comprises step of receiving a digitized interrogation signal from an analog-to-digital converter. Then. It is determined whether at least four samples of the digitized interrogation signal have a successive rise in signal strength of at least 1 dB; and whether at least five samples of the digitized interrogation signal exceed a first predetermined threshold. A moving threshold that increases as a peak pulse is detected is calculated. A delayed digitized interrogation signal is then received. Then a pulse is identified as a 3 dB pulse if an amplitude of a sample of the delayed digitized interrogation signal is greater than 3 dB and a MTL (minimum trigger level) crossing is true; and a pulse is identified as a 6 dB pulse if an amplitude of a sample of the delayed digitized interrogation signal is greater than 6 dB and a MTL crossing flag is true.

BRIEF DESCRIPTION OF THE DRAWINGS

The present invention will hereinafter be described in conjunction with the following drawing figures, wherein like numerals denote like elements, and.

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 5:
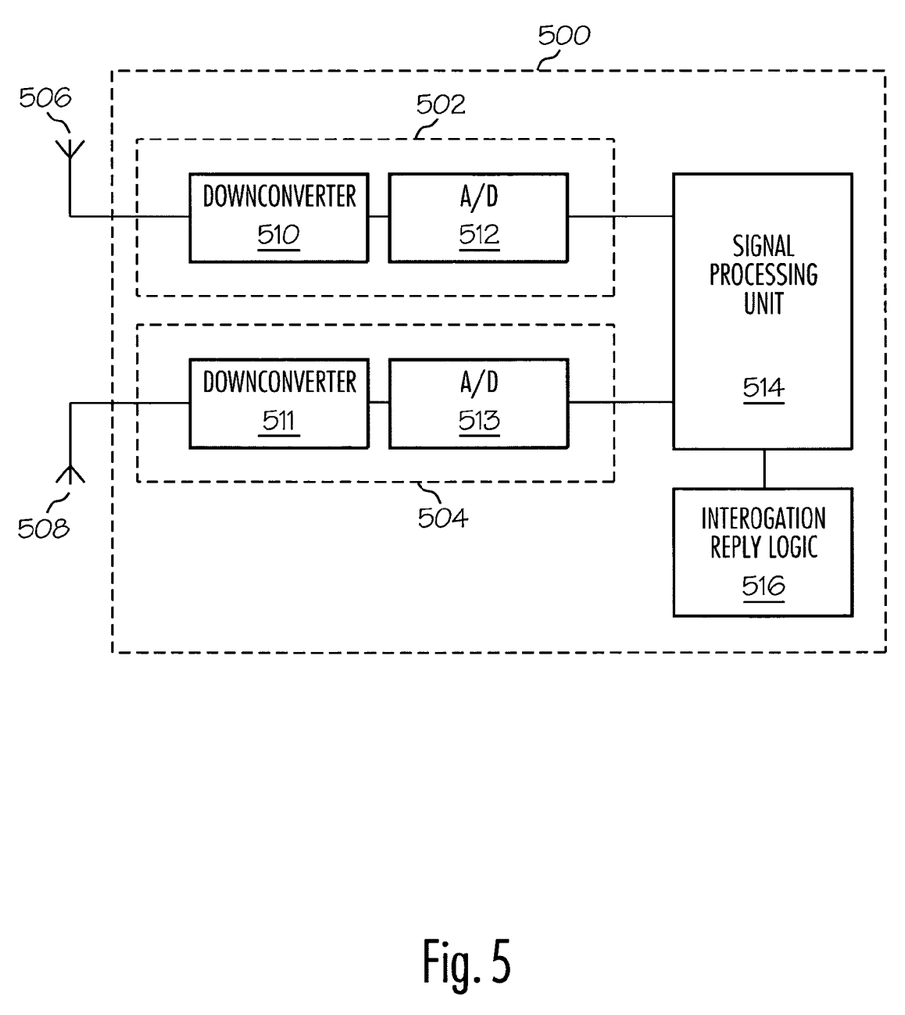
FIG. 5 is a block diagram illustrating a transponder in accordance with an exemplary embodiment of the invention.

In FIG. 5, a transponder 500 for the real time processing of interrogation pulses is illustrated. The transponder 500 includes a first receiver path 502 and a second receiver path 504. First receiver path 502 and second receiver path 504 are substantially similar except that the first receiver path 502 is coupled to a top antenna 506 and the second receiver path 504 is coupled to a bottom antenna 508. Since both paths are substantially similar, only one receiver path will be described.

Top antenna 506 is coupled to a downconverter 510 which in turn is coupled to an analog-to-digital converter 512. Bottom antenna 508 is coupled to a downconverter 511, which couples to an analog-to-digital converter 513. A signal processor unit 514 is coupled to the analog-to-digital converter 512 and the analog-to-digital converter 513. The signal processor unit 514 also couples to an interrogation/reply logic 516.

Top antenna 506 receives signals from the ground station in the form of radio frequency (RF) signals. Downconverter 510 converts the RF signals received at the top antenna 502 to intermediate frequency (IF) signals. In one exemplary embodiment, the received RF signal is a 1030 MHz interrogation signal, which is downconverted to a 60 MHz IF signal. The downconverted IF signal is digitized at the analog-to-digital converter 512 to produce a digitized signal. The digitized signal is received by signal processor unit 514, which is configured to process interrogation pulses in the received signal. Signal processor unit 514 can be any processor operable to determine the existence of interrogation pulses in the digitized signal. For example, signal processor unit 514 can be a digital signal processor, an application specific integrated circuit (ASIC), a field programmable gate array (FPGA), or the like. Interrogation/reply logic 516 receives the results determined in signal processor unit 514 and performs the operations necessary to generate a reply. In one exemplary embodiment, signal processor unit 514 and interrogation/reply logic 516 can be fabricated on the system digital signal processor, ASIC, field programmable gate array or the like.

Figure 6:
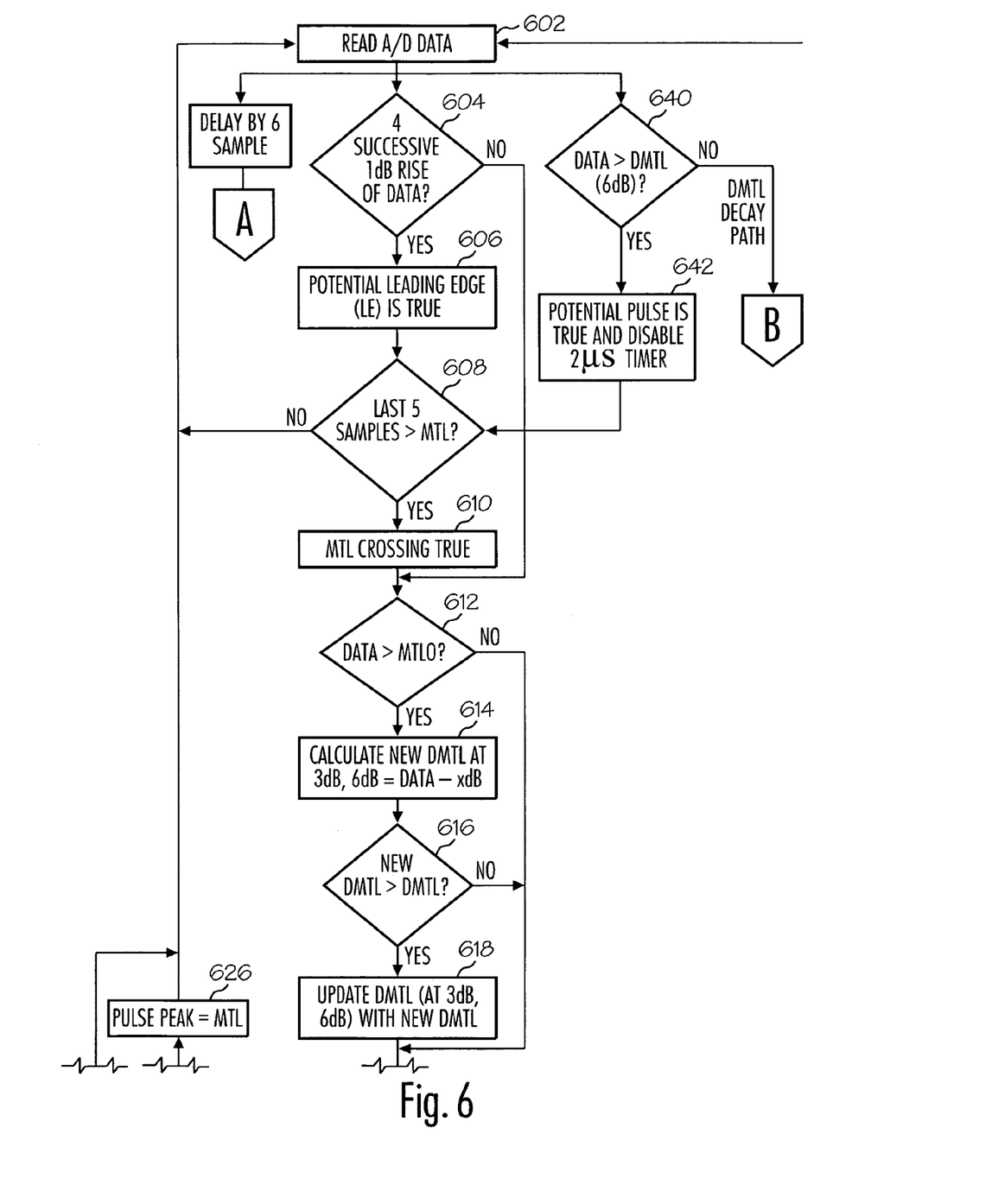
FIG. 6 is a flowchart illustrating a pulse processing method in accordance with an exemplary embodiment of the invention.
Figure 7:
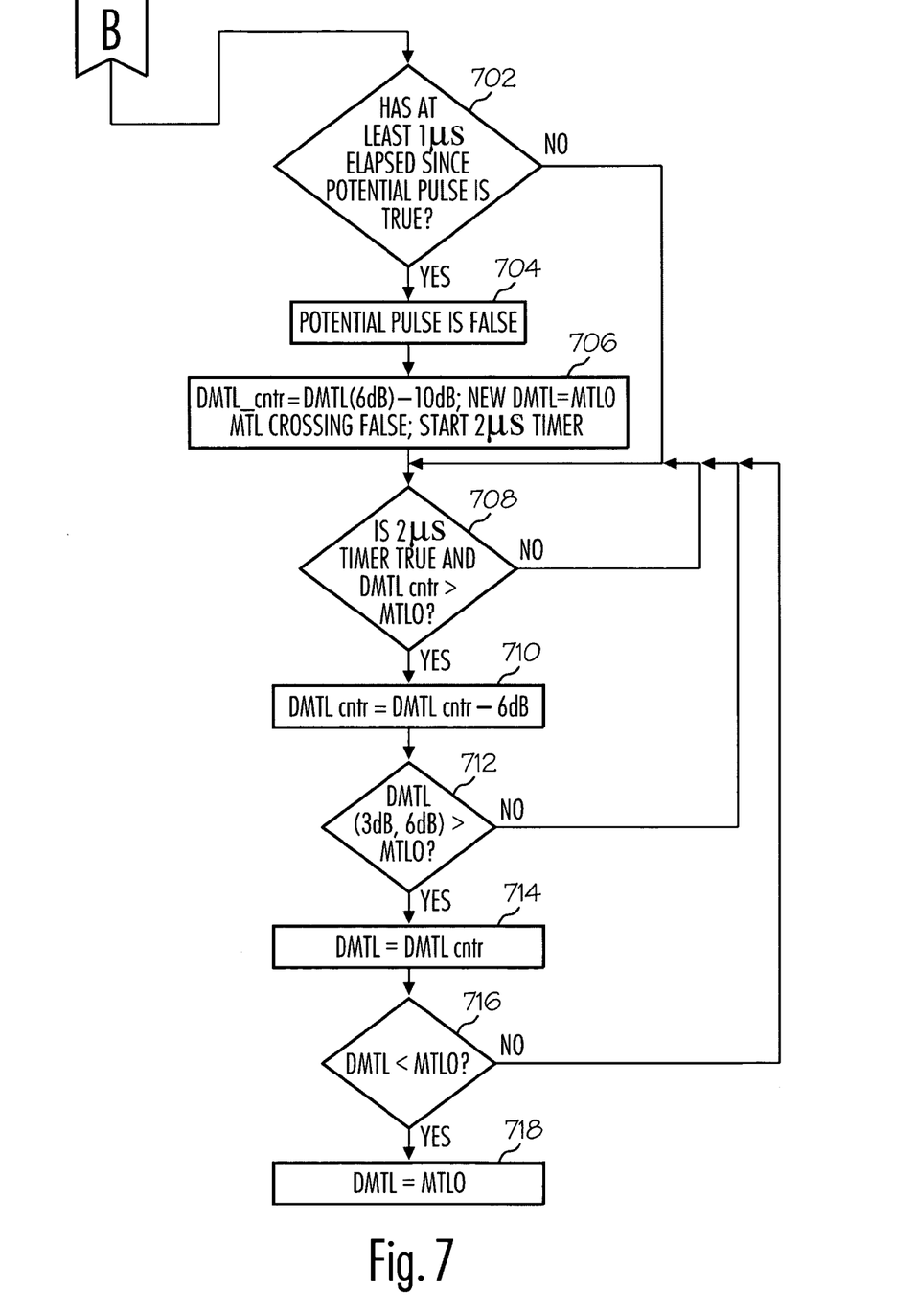
FIG. 7 is a flowchart of a method for decreasing moving threshold values in accordance with an exemplary embodiment of the invention.
Figure 8:
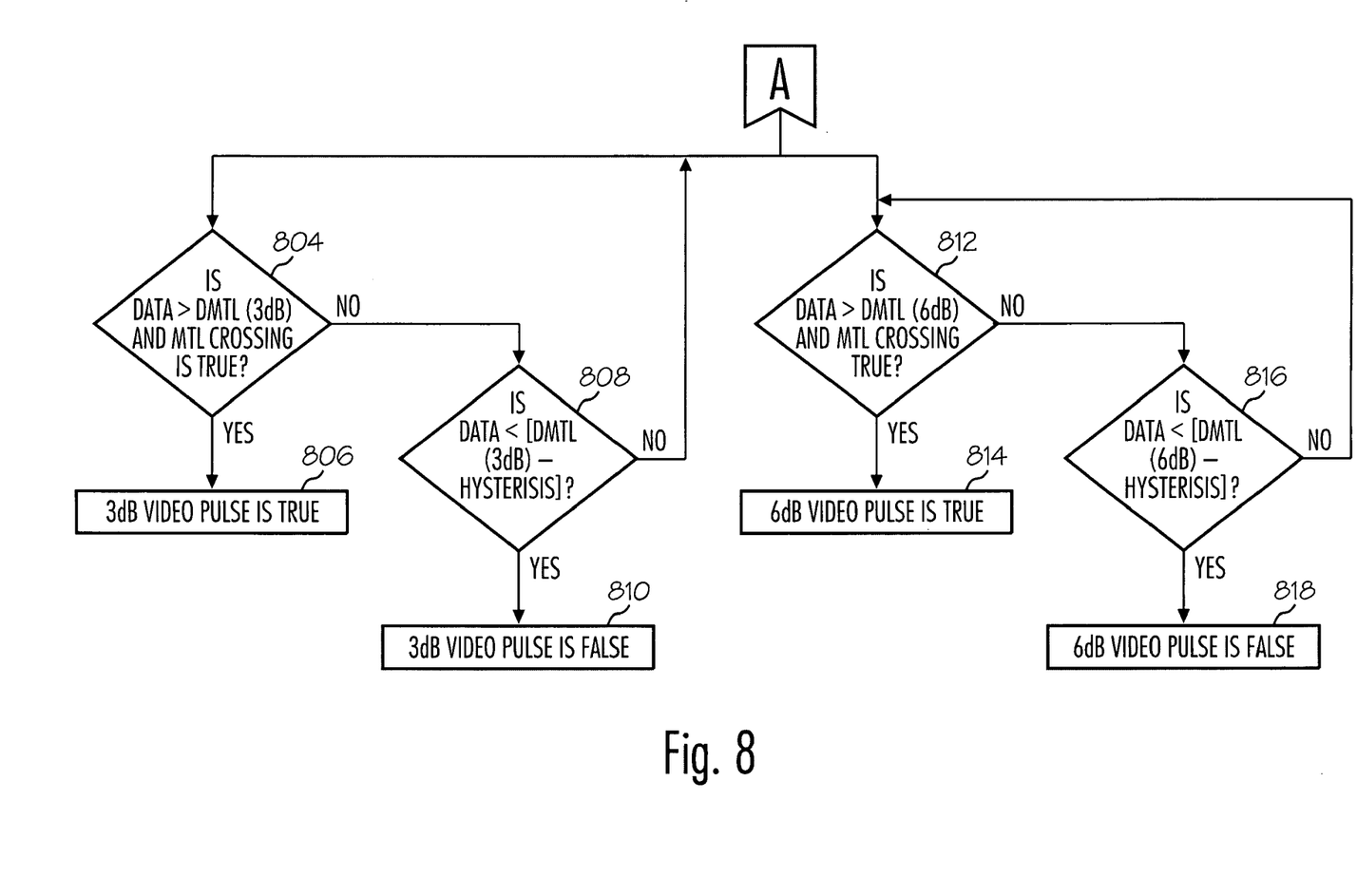
FIG. 8 is a flowchart of a method for determining the type of pulse in accordance with an exemplary embodiment of the invention.
Figure 9:
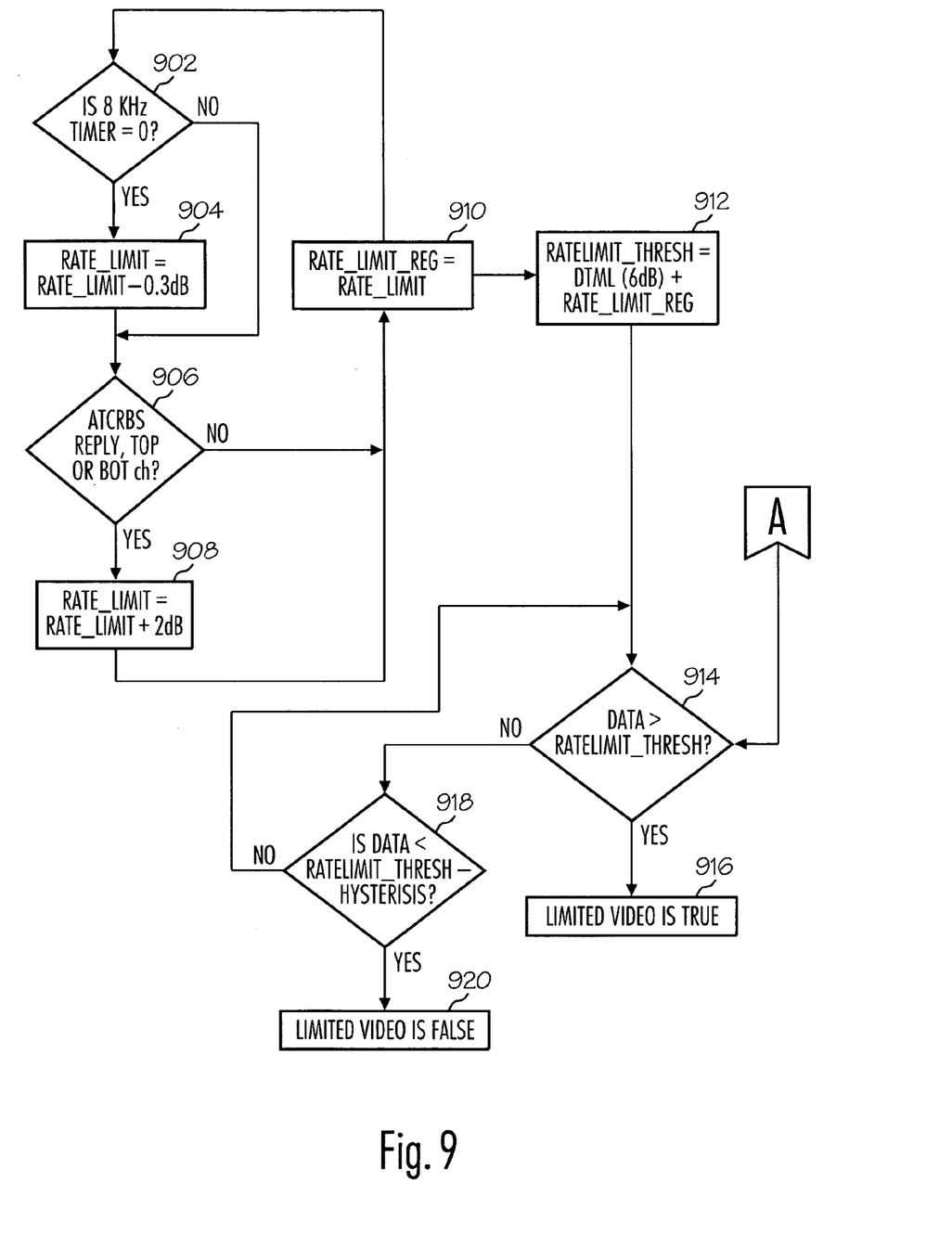
FIG. 9 is a flowchart of a method for an ATCRBS rate inhibitor in accordance with an exemplary embodiment of the invention.

FIG. 6 is a flowchart for a method for determining peak amplitude of a received pulse. The flowchart is split into two main paths. In path A, also known as a delayed path, digital data is delayed by six samples and then processed. In path B, also known as a non-delayed path, digital data is processed to calculate thresholds such as a dynamic minimum trigger level (DMTL) during the six sample period. The DMTL is a variable threshold which follows pulse shape during the leading edge of a pulse. FIGS. 6 and 7 are part of the non-delayed path and FIGS. 8 and 9 are part of the delayed path.

In step 602, digitized data is received from the analog-to-digital converter. In the present invention, all pulse processing is done digitally. In step 604, it is determined whether four successive samples have been received from the analog-to-digital converter that have at least a 1 dB rise in signal strength as compared to the previous samples.

If there are four successive samples that each experience a 1 dB rise over previous samples, then the detected samples represent a potential leading edge for a pulse, and a potential leading edge flag is set to true in step 606. If four successive samples that experience a 1 dB rise over previous samples are not received, the process continues with step 612, which will be discussed in detail below.

In step 608, if the potential leading edge flag is set to true, it is then determined whether the signal strength of the last five samples have passed a minimum triggering level (MTL). The MTL is a level set by the noise floor of the receiver. In one exemplary embodiment, MTL is set at −74 dBm. If the last five samples have crossed MTL, then, in step 610, a MTL crossing flag is set to true. If the last five samples have not crossed the MTL, then the process starts over at step 602.

If the MTL crossing flag is set to true, then, in step 612, it is determined whether the signal strength of the received data exceeds a second threshold level denoted MTL0. MTL0 is a triggering level that is set lower than the MTL threshold. The design of the receiver in the present invention combined with the processing of pulses in an all-digital process allows received signals to be examined for changes below the MTL. While MTL is a threshold that is set per instructions provided by the Minimum Performance Standards for ATCRBS/Mode S Airborne Equipment (RTCA/D0-181C), MTL0 is a threshold developed for use in the present invention. By detecting pulses at or above the MTL0 level but below MTL the present invention can detect potential pulses at lower signal strength. This also allows accurately decoding pulses and beginning of a pulse when the interrogation pulses are at MTL. In one embodiment, MTL0 is set 4 dB below the MTL level.

Step 612 is also reached if, in step 604, four samples of data that increased by 1 dB were not detected. Checking if the signal is greater than MTL0 even though four samples of data that increase by 1 dB was not detected, allows for the detection of pulses below MTL and above MTL0. Step 612 is also reached when data represents a pulse top.

If the signal strength of the data is greater than MTL0, then, in step 614, another set of triggering levels are updated. These levels are known as the dynamic MTL (DMTL) and include a 3 dB DMTL (DMTL$_3$) and a 6 dB DMTL (DMTL$_6$). Unlike the MTL and MTL0, which always remains fixed at the same signal strength level, the DMTL can change. In step 614, the DMTL$_3$ and DMTL$_6$ are set at 3 dB and 6 dB below the current data signal strength.

In step 616, it is determined whether the DMTL$_3$ and the DMTL$_6$ are greater than the previous DMTL$_3$ and DMTL$_6$. Rising DMTL$_3$ and DMTL$_6$ values are indicative of data that is coming from the rising edge of a pulse. If the DMTL$_3$ and DMTL$_6$ values are not increasing, either the data is coming from the peak of a pulse or from a falling edge. If the DMTL$_3$ and DMTL$_6$ are rising, the process continues at step 618, otherwise, the process continues at step 620.

In step 618, DMTL$_3$ and DMTL$_6$ are set equal to the new DMTL$_3$ and DMTL$_6$ values. Then, in step 620, it is determined whether a potential pulse flag is true and if the signal strength of the data exceeds the pulse peak signal strength value. This step is also reached if the signal strength of the data did not exceed the MTL0 in step 612 or if the new DMTL values did not exceed the previous DMTL values in step 616. The potential pulse flag is set to true if it is likely there is a potential pulse, and is set to false if it is not likely there is a potential pulse. To determine the setting of the potential pulse flag, in step 640 it is determined whether the received data signal strength exceeds the current DMTL$_6$. If the data signal strength exceeds the DMTL$_6$, then the potential pulse flag is set to true and a 2 μs counter, which will be explained later, is disabled in step 642. If the data signal strength did not exceed the DMTL$_6$, in step 640, the potential pulse flag is not set to true and will not be true at step 620. If the potential pulse flag is not set to true, or if the data signal strength falls below the pulse peak the process continues at step 626 where the pulse peak is set at the MTL value if step 625 is false and the process begins again at step 602.

If the potential pulse flag is set to true and the data signal strength exceeds a variable known as pulse peak, then in step 622 it is determined whether the data signal strength is within +/−1 dB of previous data. This is used to eliminate noise such as noise spikes. Also, if multiple signals are near each other, this can indicate the top of the pulse. The +/−1 dB threshold allows for the presence of noise at the peak. If the data is within +/−1 dB of the previous data, then the pulse peak is set to the signal strength of the current data. However, if the signal strength of the data was not within +/−1 dB of the previous values, pulse peak does not change and the process reaches step 625.

Once the pulse peak is set to the signal strength of the current data, it is determined whether this pulse peak, which was calculated from one receiver path, is greater than the pulse peak determined from the other receiver path. In one exemplary embodiment, the data at step 602 is processed in the bottom channel because the data is received at the bottom antenna. The other data, not pictured but determined in the same or substantially the same manner as outline in FIG. 6, is data received by the top antenna, and is therefore data from the top channel. The signal strength of the signal from the top channel and the signal strength of the signal from the bottom channel are compared in step 628. The signal having the largest signal strength is indicative of whether the interrogations are being received from a source closer to the bottom antenna or to the top antenna. In order to demodulate the DPSK modulated carrier wave, in a single DPSK demodulator scheme, the largest signal strength between the top channel and bottom channel is determined and used in the demodulation. Similarly, determination of whether the signal source is closer to the top channel or bottom channel is used to determine which channel and antenna be used to reply.

The method shown in FIG. 6 determined the amplitude of the peak pulse, the antenna that received the strongest signal, the potential leading edge flag, the potential pulse, the MTL crossing flag, the peak pulse value, and the values of DMTL$_3$ and DMTL$_6$. After a pulse is detected, the values for DMTL$_3$ and DMTL$_6$ need to decrease in order for the system to be able to detect the next pulse. For example, if the pulse initially detected is the P$_1$ pulse, the transponder must be able to pick up a potential P$_2$ pulse. This means that the DMTL$_3$ and DMTL$_6$ values need to be reduced back to the MTL0 level. DMTL 3 and DMTL$_6$ values are held constant through the arrival of the P$_2$ pulse. This allows detection of the P$_2$ pulse within −6 dB of the P$_1$ pulse and rejects the P$_2$ pulse when it is below the P$_1$ pulse by 9 dB or more.

A method to decay the DMTL values is shown in FIG. 7. As discussed previously, in step 640, it is determined whether the data signal strength exceeds the DMTL$_6$ value. The "no" output of step 640 is an initial condition for the method of FIG. 7. Therefore, at the beginning of the method of FIG. 7, the received data signal strength is below DMTL$_6$. At the same time, the DMTL decay path is initiated. In step 702, it is determined whether 1 μs has elapsed since the potential pulse flag was set to true. If more than 1 μs has elapsed, the potential pulse flag is set to false in step 704. Since the process, as described in FIG. 6, is designed to determine the leading edge of a pulse such as P1, P2, and P3, and since 1 μs is larger than the pulse width of those pulses, if more than 1 μs has passed beyond the potential pulse, the detected potential pulse cannot be a pulse of type P$_1$, P$_2$ or P$_3$. The decay path is not executed in the middle of a P$_4$ or P$_6$ pulse since step 640 is true. Therefore, the potential pulse flag is set to false in step 704. If at least 1 μs has not elapsed in step 702, the process then goes to step 708.

In step 706, a counter, denoted DMTL$_{cntr}$, is set to DMTL$_6$-10 dB. In addition, the new DMTL is set equal to MTL0, and a MTL crossing flag is set to false. Also, at this step, the 2 μs timer is started. In step 708, it is determined whether the 2 μs timer has expired and if DMTL$_{cntr}$ is greater than the MTL0. If both of these conditions are fulfilled, in step 710, DMTL$_{cntr}$ is set to DMTL$_{cntr}$-6 dB. If these conditions are not fulfilled, the process goes back to the beginning of step 708. In step 712, it is determined whether the DMTL$_3$ and DMTL$_6$ are greater than the MTL0. If DMTL$_3$ and DMTL$_6$ are greater than MTL0, DMTL is set to DMTL$_{cntr}$ in step 714. If, in step 712, DMTL$_3$ and DMTL$_6$ are not greater than MTL0, the process returns to step 708.

Once DMTL is set to DMTL$_{cntr}$, in step 716 it is determined if DMTL (both DMTL$_3$ and DMTL$_3$) is less than MTL0. This step checks whether the attempts to decrease DMTL have decreased DMTL below the lowest level, MTL0. If DMTL has decreased below MTL0, DMTL is set to MTL0 in step 718. If, at step 716, DMTL is not below MTL0, the process returns to step 708.

After finding DMTL$_3$ and DMTL$_6$, and determining the peak pulse, it is then determined whether the potential pulse is a 6 dB pulse, a 3 dB pulse, or if there is not a pulse. FIG. 8 is a flowchart for determining whether there is a 3 dB pulse and or a 6 dB pulse. A 3 dB pulse is 3 dB below the top of the pulse and a 6 dB pulse is 6 dB below the top of the pulse. The 6 dB pulse is used in further calculations to determine the pulse width. The 3 dB pulse is used to reject P$_2$ and P$_4$ pulses when they fall below a 9 dB and 6 dB threshold. First, in step 802, the process is delayed six samples to allow for the DMTL values to be determined, as seen in conjunction with FIG. 6.

After the delay, in step 804, if it is determined that the signal strength of the data is greater than $DMTL_3$ and a MTL crossing flag is set to true, then, in step 806 the pulse is a 3 dB pulse. If, in step 804, the data signal strength is not greater than $DMTL_3$, if the MTL crossing flag is not set to true, or if both of those conditions are present, then, in step 808, it is determined whether the data signal is less than $DMTL_3$ less a small hysterisis amount, then the 3 dB pulse flag is set to false. In one exemplary embodiment, the hysterisis amount is set to 1 dB. If, at step 808, the data signal is not less then $DMTL_3$ less a hystersis amount, the method returns to step 804.

The data is also checked in step 812, to determine whether the data signal strength is greater than $DMTL_6$ and also whether the MTL crossing flag is true. If both conditions are true, then, in step 814, a 6 dB pulse is set to true. If one or both conditions of step 816 are not true, than in step 818 it is determined whether the data is less than $DMTL_6$ less a hysterisis amount. If it is, than the 6 dB pulse is set to false. The existence and size of pulses are then used in backend processes to determine the reception of pulses and the strength of the pulses to assist in distinguishing between Mode S and ATCRBS interrogations, determining if a top or a bottom channel should be used, and determining how to respond to interrogations. In one exemplary embodiment, backend processes can be executed at interrogation/reply logic 516.

During the processing of the pulses, the aircraft is still subject to interrogations from the ground station. In Mode S, after identification of the aircraft, the interrogations are selective to a specific aircraft. ATCRBS interrogations are not selective and ATCRBS interrogations will continue to be sent to the aircraft. This can result in too many replies from the aircraft, which can cause interference. To help alleviate this problem, a limit to the amount of replies that an aircraft can send is applied. This is known as an ATCRBS rate limiter. In this method, at step 902 in FIG. 9, an 8 kHz timer is checked to determine whether it is equal to zero; i.e., if the timer has expired. If the timer has expired, in step 904 a rate_lim variable is set to the value of the previous rate_lim, less 0.3 dB.

Step 906 is reached either after step 904 or if the timer is not expired. In step 906, it is determined whether there has been an ATCRBS reply. If there has been an ATCRBS reply, in step 908 the rate_lim variable is set at the previous rate_lim value plus 2 dB. In step 910 a rate limit regulator, rate_lim_reg, is set equal to the current rate_lim value.

The rate limit regulator will be used to determine a rate limit threshold, rate_lim_thresh, in step 912. The rate_lim_thresh is set at the $DMTL_6$ value plus the rate_lim_reg. Then, in step 914, it is determined if a data value from step 602 of FIG. 6 is greater than the rate_lim_thresh. In one embodiment, the data value from step 602 is delayed by approximately six samples. If the data is greater than the rate_lim_thresh, a rate limit pulse is set to true in step 916, and ATCRBS interrogations are ignored.

If the data is not greater than the rate_lim_thresh, then, in step 918 it is determined if data is less than the rate_lim_thresh, less a hysterisis amount. If the data is less than the rate_lim_thresh less a hysterisis amount, than the rate limit flag is set to false in step 920. When the data is not less than the rate_lim_thresh less a hysterisis amount the method returns to the beginning of step 914. While steps 912 through 920 are executing, after the rate_lim_reg is set in step 910, control also goes to step 902, where the method continues.

The exemplary embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed:

1. A method for processing pulses from interrogations in a Mode S/ATCRBS transponder comprising the steps of:
   receiving a digitized interrogation signal from an analog-to-digital converter;
   determining a peak pulse of the digitized interrogation signal; and
   determining a type of the peak pulse,
   wherein the step of determining a peak pulse further comprises:
      determining whether at least four samples of the digitized interrogation signal have a successive rise in signal strength of at least 1 dB;
      determining whether at least five samples of the digitized interrogation signal exceed a first predetermined threshold; and
      determining a moving threshold that increases as a peak pulse is detected.

2. The method of claim 1, further comprising the step of determining whether an ATCRBS rate limit is needed.

3. The method of claim 1, wherein the step of determining a peak pulse further comprises:
   if at least four samples of the digitized interrogation signal do not have a successive rise in signal strength of 1 dB, determining whether samples of the digitized interrogation signal exceed a signal threshold, the second threshold being lower than the first; and
   determining a moving threshold that increases as a peak pulse is detected.

4. The method of claim 1, further comprising:
   detecting a first peak pulse from an interrogation signal received at a top antenna; detecting a second peak pulse from the interrogation signal received at a bottom antenna; and
   selecting a peak pulse based on a comparison of signal strength of the first peak pulse and the second peak pulse.

5. The method of claim 1, wherein the step of determining a type of pulse further comprises determining that the pulse is a 6 dB type pulse.

6. The method of claim 1, wherein the step of determining a type of pulse further comprises determining that the pulse is a 3 dB type pulse.

7. The method of claim 3, wherein the moving threshold is reduced to a second threshold after the peak pulse is selected.

8. A method for processing pulses from interrogations in a Mode S/ATCRBS transponder comprising the steps of:
   receiving a digitized interrogation signal from an analog-to-digital converter;
   determining a peak pulse of the digitized interrogation signal; and
   determining a type of the peak pulse, wherein the step of determining a type of pulse further comprises:
processing a delayed digitized interrogation signal;
identifying a pulse as a 3 dB pulse if an amplitude of a sample of the delayed digitized interrogation signal is greater than a 3 dB and a MTL crossing flag is true; and
identifying a pulse as a 6 dB pulse if an amplitude of a sample of the delayed digitized interrogation signal is greater than a 6 dB and a MTL crossing flag is true.

9. An apparatus for processing pulses in ATCRBS/Mode S interrogations comprising:
an antenna for receiving a radio frequency interrogation signal;
a downconverter for downconverting the radio frequency interrogation signal to an intermediate frequency signal;
an analog-to-digital converter operable to convert the intermediate frequency signal to a digitized interrogation signal; and
a processing unit coupled to the analog-to-digital converter, the processing unit configured to detect a pulse peak in the digitized interrogation signal using a moving threshold to locate the pulse between a first fixed threshold and a second fixed threshold, the processing unit determines whether at least four samples of the digitized interrogation signal have a successive rise in signal strength of at least 1 dB, determines whether at least five samples of the digitized interrogation signal exceed a first predetermined threshold, and determines a moving threshold that increases as a peak pulse is detected.

10. The apparatus of claim 9, wherein the processing unit is further configured to decay a signal strength value of the moving threshold after detecting a pulse.

11. The apparatus of claim 9, wherein the processing unit is further configured to determine if a pulse is a 3 dB pulse or a 6 dB pulse.

12. The apparatus of claim 9, wherein the processing unit is further configured to limit responses to ATCRBS interrogations.

13. The apparatus of claim 9, wherein the processing unit is further operable to select data from a first channel or a second channel.

14. The apparatus of claim 11, wherein the processing unit is further configured to:
process a delayed digitized interrogation signal;
identify a pulse as a 3 dB pulse if an amplitude of a sample of the delayed digitized interrogation signal is greater than 3 dB and a MTL crossing is true; and
identify a pulse as a 6 dB pulse if an amplitude of a sample of the delayed digitized interrogation signal is greater than 6 dB and a MTL crossing is true.

15. The apparatus of claim 9, further comprising reply logic to generate a reply to an interrogation based on the peak pulse.

16. The apparatus of claim 9, wherein the processing unit is a field programmable gate array.

17. A method for processing pulses from ATCRBS/Mode S interrogations comprising:
receiving a digitized interrogation signal from an analog-to-digital converter;
determining whether at least four samples of the digitized interrogation signal have a successive rise in signal strength of at least 1 dB;
determining whether at least five samples of the digitized interrogation signal exceed a first predetermined threshold;
determining a moving threshold that increases as a peak pulse is detected;
processing a delayed digitized interrogation signal;
identifying a pulse as a 3 dB pulse if an amplitude of a sample of the delayed digitized interrogation signal is greater than 3 dB and a MTL crossing is true; and
identifying a pulse as a 6 dB pulse if an amplitude of a sample of the delayed digitized interrogation signal is greater than 6 dB and a MTL crossing is true.

18. The method of claim 17, further comprising:
detecting a first peak pulse from an interrogation signal received at a top antenna;
detecting a second peak pulse from the interrogation signal received at a bottom antenna; and
selecting a peak pulse based on a comparison of signal strength of the first peak pulse and the second peak pulse.

* * * * *